(12) United States Patent
Künkel (10) Patent No.: US 6,308,068 B1
(45) Date of Patent: Oct. 23, 2001

(54) METHOD AND ARRANGEMENT IN A RADIO COMMUNICATION NETWORK

(75) Inventor: Lars Peter Künkel, Landskrona (SE)

(73) Assignee: Telefonaktiebolaget LM Ericsson (publ)

(*) Notice: Subject to any disclaimer, the term of this patent is extended or adjusted under 35 U.S.C. 154(b) by 0 days.

(21) Appl. No.: 09/067,592

(22) Filed: Apr. 27, 1998

(30) Foreign Application Priority Data

Apr. 29, 1997 (SE) .................................... 9701617

(51) Int. Cl.[7] .................................................. H04Q 7/20
(52) U.S. Cl. .......................... 455/434; 455/466; 455/515; 455/553
(58) Field of Search .................... 455/434, 422, 455/343, 574, 552, 515, 38.2, 38.3, 466, 553, 426, 433, 435, 556, 557, 458; 370/493, 494, 495; 375/219, 222–224, 274, 305

(56) References Cited

U.S. PATENT DOCUMENTS

| 5,420,911 | 5/1995 | Dahlin et al. ............................ 379/59 |
| 5,870,673 | * 2/1999 | Haartsen ................................. 455/422 |
| 5,930,706 | * 7/1999 | Raith ....................................... 455/422 |
| 5,991,635 | * 11/1999 | Dent et al. .............................. 455/343 |
| 6,009,325 | * 12/1999 | Retzer et al. ............................ 455/434 |

FOREIGN PATENT DOCUMENTS

| 0 526207 A2 | 2/1993 | (EP) . |
| WO 94/27377 | 11/1994 | (WO) . |
| WO 95/34178 | 12/1995 | (WO) . |
| WO 96/26619 | 8/1996 | (WO) . |

OTHER PUBLICATIONS

*PCT International Type Search Report*, Feb. 18, 1998, Search Report No. SE 97/00449.

\* cited by examiner

*Primary Examiner*—Daniel Hunter
*Assistant Examiner*—Pablo Tran
(74) *Attorney, Agent, or Firm*—Jenkens & Gilchrist A Professional Corporation (57) ABSTRACT

A method and arrangement enabling a mobile station (MS1), operating in standby mode and monitoring a control channel (CC1) in a first radio communication network (NET1), to scan for other radio channels (CC4–CC6) without missing messages, e.g. page messages, on the control channel (CC1) intended for the mobile station (MS1). Each message comprises at least one repeated block of information bits. Upon receipt of a message on the monitored control channel (CC1), the mobile station (MS1) dynamically determines a time period during which the blocks of information conveying the message contains no new information intended for the mobile station (MS1). At least part of said time period is then used for scanning of other radio channels (CC4–CC6).

56 Claims, 8 Drawing Sheets

METHOD AND ARRANGEMENT IN A RADIO COMMUNICATION NETWORK

TECHNICAL FIELD OF THE INVENTION

The invention relates to a method and an arrangement in a communication network. More precisely the invention relates to a method and an arrangement for controlling scanning of radio channels by a mobile station operating in standby mode in a radio communication network.

DESCRIPTION OF RELATED ART

A mobile station in standby mode (idle mode), i.e. when neither originating or receiving a call, is monitoring a control channel in a serving cell of a first cellular network for the purpose of receiving system information and paging messages.

While in standby mode and thus monitoring the control channel of the serving cell, there is often also a need for the mobile station to scan for other radio channels. There may be several different reasons for performing channel scanning e.g. finding a control channel in the first network having superior signal quality or finding a control channel of a second preferred network.

In networks using time division multiple access (TDMA) technology, e.g. networks according to the GSM or PDC standards, each control channel is only allocated certain time slots. Some of the remaining time slots may be used by the mobile station for channel scanning. As an example, a GSM mobile station operating in a visited network uses some of the remaining time slots to scan for both control channels of the visited network having superior signal quality as well as control channels of a home network.

In many other networks using other technologies than TDMA, e.g. Frequency Division Multiple Access (FDMA) or Code Division Multiple Access (CDMA), the control channel information is transmitted continuously without any time gaps. Examples of such networks are networks according to the AMPS, TACS or NMT standards. Since the control channel information is transmitted continuously the mobile station is at all times busy monitoring the control channel of the serving cell and hence there is no free time available to scan for other radio channels. The basic problem is that if the mobile station were to scan for other radio channels during certain time intervals, the mobile station runs the risk of missing paging messages indicating incoming calls to the mobile station.

U.S. Pat. No. 5,260,988 describes a dual mode cellular cordless portable radiotelephone. The radiotelephone preferentially selects to operate in a cordless system over a cellular network. When the radiotelephone is operating in the cellular network, the radiotelephone scans for a radio channel associated with the cordless system. When said radio channel is detected, the radiotelephone changes its mode of operation and starts operating in the cordless system. When operating in the cellular network, the radiotelephone must monitor a control channel for page messages indicating an incoming call. Each page message is repeated. The radiotelephone schedules the scanning for radio channels in a way that ensures the radiotelephone never misses an incoming call because it was scanning for radio channels during both page messages transmission times. The scheduling is done by determining two fixed time periods, one for monitoring the control channel and one for channel scanning, having a special relationship derived from the time between the two page messages and the time needed to transmit one page message.

A disadvantage of the described way of scheduling channel scanning is that there is an increased risk that an incoming call will not be detected by the radiotelephone since the radiotelephone only monitors the control channel when one of the two page messages are transmitted.

The international patent application WO 95/34178 describes a channel scanning method for use in a cellular network. The method involves transmitting from a base station a control signal to at least one mobile station for informing them that no pages will be issued for a predetermined time period. Upon receipt of said control signal the mobile station scans for radio channels in the network having superior characteristics during said time period. If such a channel is found, the channel number is stored in the mobile station for later use.

This channel scanning method requires that there is a special control signal (message), e.g. the battery saving order message in networks of the NMT type, indicating the time during which no pages will be issued and the method can thus only be used in networks where such a special message is transmitted.

The international patent application WO 94/27377 describes a method for reducing standby power consumption of a mobile station. The method involves receiving messages in a mobile station from a base station. The messages comprises repeated blocks of information bits, each block having a number of data bits and check bits whose value depends on the data bits. Check indication is generated when the data bits and check bits are consistent with each other. When a check indication is generated, portions of the mobile station are turned off until receipt of a next block of non redundant information is expected.

The described method is solely directed to the problem of reducing standby power consumption in the mobile station.

SUMMARY OF THE INVENTION

The problem dealt with by the present invention is enabling a mobile station, operating in standby mode and monitoring a control channel in a first radio communication network, to scan for other radio channels without missing information on the control channel intended for the mobile station.

The problem is solved essentially by a method implemented in the mobile station in which upon receipt of a message on the monitored control channel, the mobile station dynamically determines a time period during which no new information intended for the mobile station will be transmitted. At least part of said time period is then used for scanning of other radio channels. The problem solution includes the necessary means for implementing the method in the mobile station.

More specifically, the problem is solved in the following manner. Each message comprises at least one block of information bits. The information bits comprises a number of data bits and a number of check bits whose value depend on said data bits. When the data bits are considered as correctly received, a first indication is generated. Upon generation of said first indication, a time period is determined during which the blocks of information conveying the message contains no new information for the mobile station. At least part of said time period is then used for scanning of other radio channels.

According to one embodiment of the invention, applicable when the information blocks are repeated a number of times, once the mobile station has correctly received an information block, said time period is determined as lasting until receipt of a next block of non redundant information is expected.

According to a second embodiment of the invention, applicable when said message comprises at least two information blocks and the mobile station can determine from the received subset of information blocks that the message is not intended for the mobile station, said time period is determined as lasting until receipt of a next message is expected.

A general intention of the invention is to provide the mobile station with a method and an arrangement for scanning for other radio channels without increasing the risk for missing information intended for the mobile station transmitted on the monitored control channel.

Another intention is to provide a method and an arrangement for channel scanning that further does not require the transmission of a special message to the mobile station with an explicit indication of a time period during which no page messages will be transmitted to the mobile station.

One advantage afforded by the invention is that the mobile station may scan for other radio channels without an increased risk for missing information intended for the mobile station transmitted on the monitored control channel.

Another advantage is that the invention does not require the transmission of a special message with an explicit indication of a time period during which no page messages will be transmitted to the mobile station.

The invention will now be described in more detail with reference to exemplifying embodiments thereof and also with reference to the accompanying drawings.

DETAILED DESCRIPTION OF THE EMBODIMENTS

Figure 1:
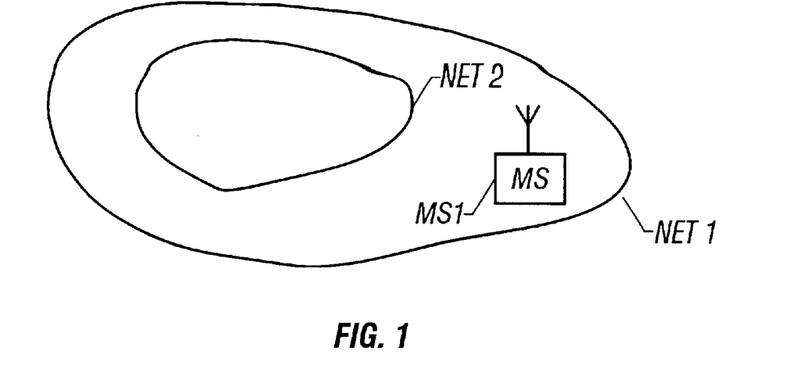
FIG. 1 is a view illustrating different coverage areas provided by two networks in a radio communication system.

FIG. 1 offers an example of a radio communication system comprising a first and a second radio communication network NET1 respective NET2. The radio coverage provided by the first and the second radio communication network NET1 respective NET2 differs. In this example the geographic area where the first network NET1 provides radio coverage includes the complete area where the second network NET2 provides coverage as well as some additional area. A person skilled in the art realises that there are several different ways that the radio coverage provided by two different networks NET1–NET2 might be related. FIG. 1 illustrates the typical initial situation when deploying a new network NET2 in an area with an already existing network NET1, e.g. when deploying a PCS1900 network in an area with an existing AMPS network. For the time being we will assume that the first radio communication network NET1 is of AMPS type while the second radio communication network NET2 is of PCS1900 type (i.e. GSM based PCS).

The PCS1900 network NET2 offers an increased range of services and features as compared to the AMPS network NET1. However, the AMPS network NET1 offers a more extensive area of radio coverage. A dual mode PCS1900/AMPS mobile station MS1 enables a person wanting to primarily buy services from the PCS1900 network operator to access the PCS1900 network services in the coverage area provided by the PCS1900 network NET2 while at the same time getting basic communication services outside this coverage area by accessing the AMPS network services in the coverage area provided by the AMPS network NET1.

Figure 2:
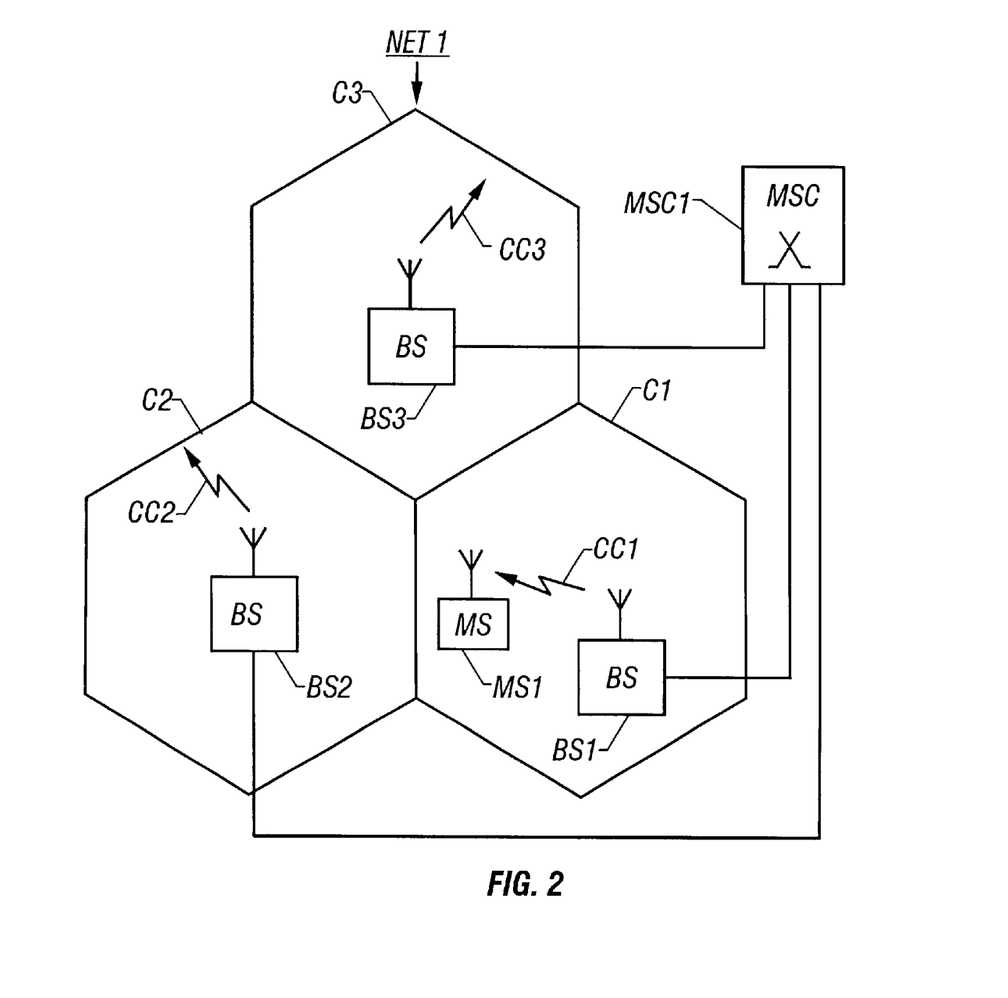
FIG. 2 is a view illustrating a portion of a cellular network.

FIG. 2 illustrates how radio coverage is provided in a cellular network. FIG. 2 shows a part of the AMPS network NET1. The geographic area covered by the network NET1 is divided into cells C1–C3. Each cell C1–C3 provides radio coverage in a certain area and is allocated a certain set of frequencies for communication in that area. Each cell C1–C3 is served by one base station BS1–BS3 with means for transmitting to and receiving from mobile stations currently located in the cell. In FIG. 2, the PCS1900/AMPS dual mode mobile station MS1 is located in cell C1. The base stations BS1–BS3 are connected to a mobile services switching centre (MSC) MSC1. The mobile services switching centre MSC1 is responsible for switching calls to and from mobile stations located in the area served by the mobile services switching centre MSC1.

In each cell C1–C3 the base station BS1–BS3 serving that cell transmits messages with control information on a control channel CC1–CC3 to mobile stations located in the cell. This control information comprises different kinds of system information as well as paging messages indicating an incoming call for a mobile station. The control channel is, in general, regarded as being bidirectional, enabling mobile stations to transmit messages with control information to the basestations. In AMPS terminology the control channel in the direction from the basestation is called a Forward analog Control Channel (FOCC), while the control channel in the direction from the mobile station is called a Reverse analog Control Channel (RECC). However, when describing the invention at hand it is only the FOCC part of the control channel that is of importance and unless otherwise stated when the term control channel is used in the context of an AMPS network this implies the FOCC.

As is well known to a person skilled in the art, a PCS1900 network has a structure that is very similar to what is shown in FIG. 2 and we will not discuss the minor differences in network structure. The equivalence of the AMPS FOCC in a PCS1900 network consists of a grouping of so called logical channels. This grouping of control channels comprises a Frequency Correction Channel (FCCH), a Synchronization Channel (SCH), a Common Control Channel (CCCH) and a Broadcast Control Channel (BCCH) all mapped onto timeslot zero of a radio channel called a BCCH carrier. In the context of a PCS1900 network, we will use the term control channel to refer to either the BCCH carrier or said combination of logical channels.

Figure 3:
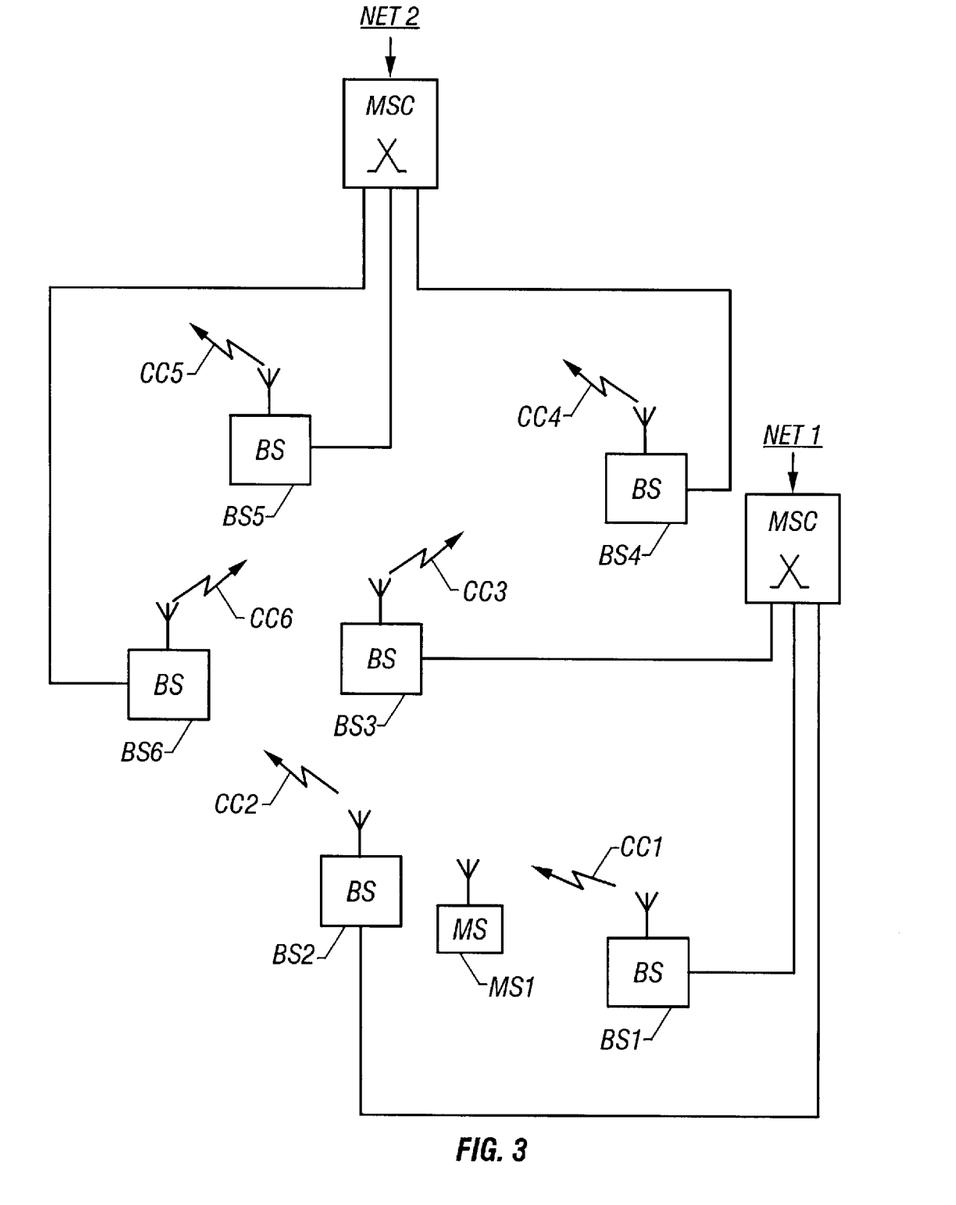
FIG. 3 is a view illustrating portions of both networks from FIG. 1.

FIG. 3 illustrates how radio base stations BS1–BS3 in the AMPS network NET1 as well as radio base stations BS4–BS6 in the PCS1900 network NET2 transmits control channels CC1–CC6. The control channels CC1–CC3 are all AMPS Forward analog Control Channels while the control channels CC4–CC6 comprises said grouping of PCS1900 logical channels. When the mobile station MS1 is operating in standby mode in the AMPS network it is monitoring one of the control channels CC1–CC3 transmitted by one of the base stations BS1–BS3 in the AMPS network for system information and page messages. Similarly when the mobile station MS1 is operating in standby mode in the PCS1900 network is is monitoring one of the control channels CC4–CC6 transmitted by one of the base stations BS4–BS6 in the PCS1900 network for the corresponding type of information.

Since the person using the mobile station MS1 in this example primarily wants to access the PCS1900 network NET2 services, the mobile station MS1 needs to be able to detect when it has moved into an area where the PCS1900 network NET2 provides radio coverage. This implies that the mobile station MS1, while operating in standby mode in the AMPS network NET1 and monitoring one of the control channels CC1–CC3, e.g. CC1, in said network, needs to be able to scan for the control channels CC4–CC6 in the PCS1900 network NET2. Scanning for the PCS1900 network control channels CC4–CC6 must be carried out in a way that ensures that the mobile station MS1 still will be able to detect incoming calls, i.e. that the mobile station MS1 receives page messages transmitted on the monitored AMPS control channel CC1.

In general, the level of difficulties in scheduling the operations of a mobile station to enable scanning for other control channels while the mobile station is operating in standby mode in a network and hence monitoring a control channel for incoming calls depends on the network technology used.

In networks using time division multiple access (TDMA) technology, e.g. PCS1900, GSM, PDC and D-AMPS with a digital control channel (DCC), each control channel is only allocated certain time slots. In PCS1900 a control channel typically only occupies time slot zero in each TDMA frame. By scheduling the channel scanning operation to use some of the remaining time slots for channel scanning, a mobile station monitoring one of said control channels does not risk missing any page messages.

In many other networks using technologies other than TDMA, e.g. AMPS, TACS and NMT, the control channel information is transmitted continuously without any time gaps. This implies that in order to ensure that the mobile station does not miss any incoming calls, the mobile station should at all times monitor the control channel of the serving cell for page messages. Thus scheduling the scanning for control channels in cellular networks not using TDMA technology poses a problem.

One way of solving this problem is described in the international patent application WO 95/34178. However, the described channel scanning method requires that a special control signal (message), e.g. a battery saving order message in networks of the NMT type, is transmitted to the mobile station indicating a time period during which no pages will be issued to the mobile station. The method can thus only be used in networks where such a special message is transmitted.

Another way of solving the problem of channel scanning by a mobile station in a network not using TDMA technology is described in U.S. Pat. No. 5,260,988. The described channel scanning method involves dividing time into predetermined fixed time periods used for channel scanning and monitoring for page messages respectively, in a way that ensures that at least one of the two transmissions of any page message indicating an incoming call occurs while the mobile station is monitoring the serving control channel for page messages. However, the reason why the page message is repeated is to provide redundancy in case the mobile station would miss the first page message transmission due to e.g shadowing. Since the described channel scanning method implies that typically the mobile station only monitors the serving control channel during one of the two page message transmissions, there is an increased risk that an incoming call will not be detected by the mobile station.

A further complication of the channel scanning method disclosed in U.S. Pat. No. 5,260.988 is that the two time periods both depend on the time between the two transmissions of a page message. The time period used for scanning must be less than the time between the two transmissions of a page message. The time period used for monitoring between each scanning period must be greater than the sum of the time between the two transmissions and the typical time to transmit two page messages. The AMPS standard does not explicitly specify that page messages should be repeated and consequently the standard does not specify said time between the two transmissions. These issues are thus left at the discretion of each network operator. Hence, it becomes very difficult to determine said time periods to ensure that the channel scanning method will work as intended in different networks and at the same time will provide a reasonable amount of time available for scanning.

The invention at hand provides a way of solving the problem of channel scanning by a mobile station in a network not using TDMA technology, e.g. an AMPS or TACS network, that requires neither a special message indicating a time period during which no pages will be transmitted, nor increases the risk that the mobile station will miss incoming calls. The basic idea of the invention is for the mobile station when receiving a message, comprising at least one block of information bits, on the monitored control channel to dynamically determine, according to a predetermined rule, a time period during which the blocks of information bits conveying the message contains no new information intended for the mobile station. At least a part of this time period may then be used for channel scanning.

If the blocks of information bits are repeated a number of times, as in e.g AMPS and TACS, then once the mobile station has correctly received a block, said time period may be determined as lasting until receipt of a next block of non redundant information is expected i.e. instead of receiving further repetitions of this block, channel scanning may be performed. Typically the mobile station determines whether or not a block of information bits, comprising data bits and check bits, has been correctly received by checking whether the received data bits are consistent with the received check bits. An alternative way of determining whether a block of information bits can be considered as correctly received is to monitor the signal strength during receiption of the information bits. If the signal was sufficiently strong, the block of information bits is then considered as correctly received.

If the received message comprises several blocks of information bits and the mobile station can determine from the received subset of information blocks that the message is not intended for the mobile station, said time period may be determined as lasting until receipt of a next message is expected.

FIG. 4 to FIG. 7 illustrates the structure of the FOCC information flow in the AMPS network NET1.

Figure 4:
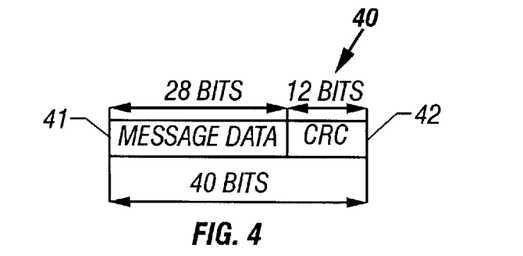
FIG. 4 is a block diagram illustrating the bit structure of an AMPS control word.

FIG. 4 shows the structure of one 40-bit control word 40, i.e. block of information bits, comprising 28 message data bits 41 and 12 CRC check bits 42 according to the EIA-553 cellular standard, i.e. the AMPS standard. The CRC code 42, whose value depends on the data bits 41, provides powerful error detection capability and optionally the ability to correct any single-bit error in the 28 message bits 41 in a manner described hereinafter.

Figure 5:
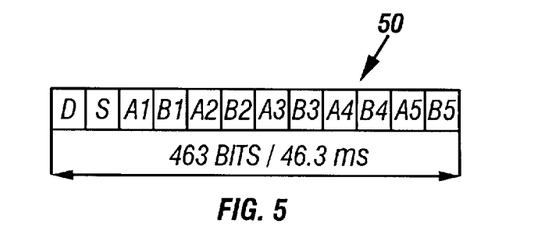
FIG. 5 is a block diagram illustrating the structure of an AMPS word block.

FIG. 5 shows the structure of one transmit cycle, i.e a word block 50, according to EIA-553. Each word block 50 conveys five repeats A1, A2, . . . A5 of a first 40-bit word "A" and five repeats B1, B2 . . . B5 of a second 40-bit word "E". The A and B words belong to independent messages intended for mobile stations having odd and even Mobile Identification Numbers (MIN) respectively.

Figure 6:
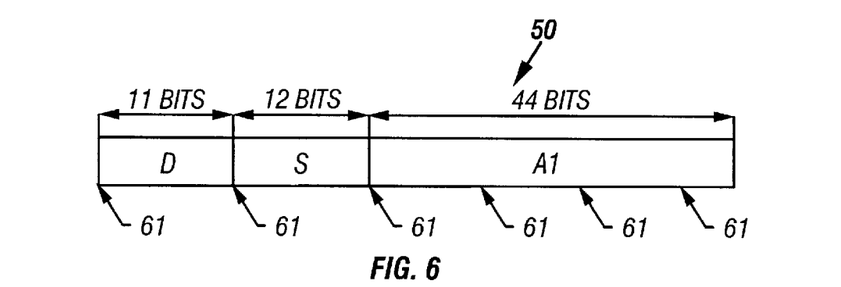
FIG. 6 is a block diagram illustrating how busy-idle bits are inserted in the AMPS word block structure.

FIG. 6 shows more detail of the preamble bit-blocks labeled D and S in FIG. 5. The "dotting sequence" D is a 10-bit block of alternating 1's and 0's intended to provide the receiver with symbol resynchronization opportunities. Symbols are transmitted using Manchester code. In the EIA-553 cellular standard, the bit rate is 10 kb/s. The Manchester coded bits are transmitted using frequency modulation of a radio carrier. Preceding the 10-bit dotting sequence is a single bit busy/idle flag 61, giving the total 11 bits labeled "D" in FIG. 5 and FIG. 6.

Following the dotting sequence D is an 11-bit sync word also preceded by a busy/idle flag 61, making the 12 bits labeled "S" in FIG. 5 and FIG. 6. This is followed by five repeats each of two 40-bit words designated A and B. Four extra busy/idle bits 61 are inserted in each word repeat making 44-bit blocks, as shown in FIG. 6. The total number of bits in a word block 50 is thus 1+10+1+11+2x5x(40+4)= 463 bits.

Figure 7:
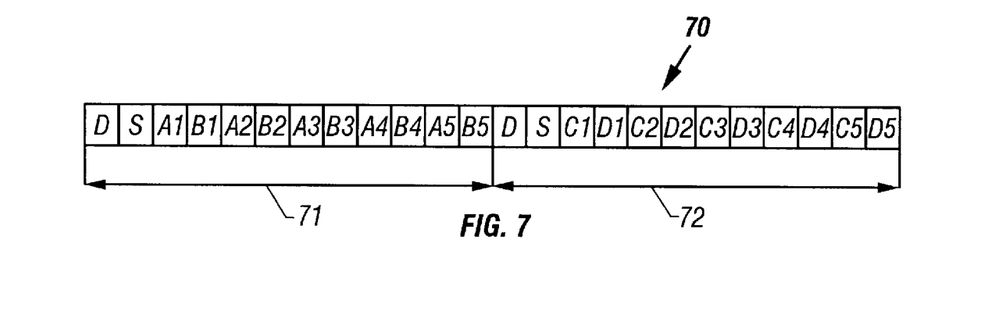
FIG. 7 is a block diagram illustrating the structure of a two word message containing a Mobile Identification Number (MIN).

In the event that a mobile station is called, it takes two 40-bit words to convey all 34 bits of its MIN. Thus, the first 24 bits of its MIN are sent in a first word block 71 and the remaining 10 bits of the MIN are sent in a second word block 72, as shown in FIG. 7. The first word of the multiple word message 70 contains a flag to indicate that continuation words are to be expected. Continuation words have a continuation flag set. The continuation flag appears in either the A or B word depending on whether the mobile has an odd or even MIN. A call can in some cases consist of more than two words and so it is necessary to look at the third word to determine if it is a continuation of an already begun message, or of a new message because, if it is determined that the first word does not contain the mobile's MIN and the continuation flag is set, then the second word does not need to be processed. If the second word is not processed, then the mobile does not know if the continuation flag is set in the second word, thus necessitating looking for a continuation flag in the third word. Other possible message types are dummy messages, or filler, which may be a single word that can be ignored, and a one- or multiple-word broadcast or "overhead" message that is to be processed by all mobile stations.

Figure 8:
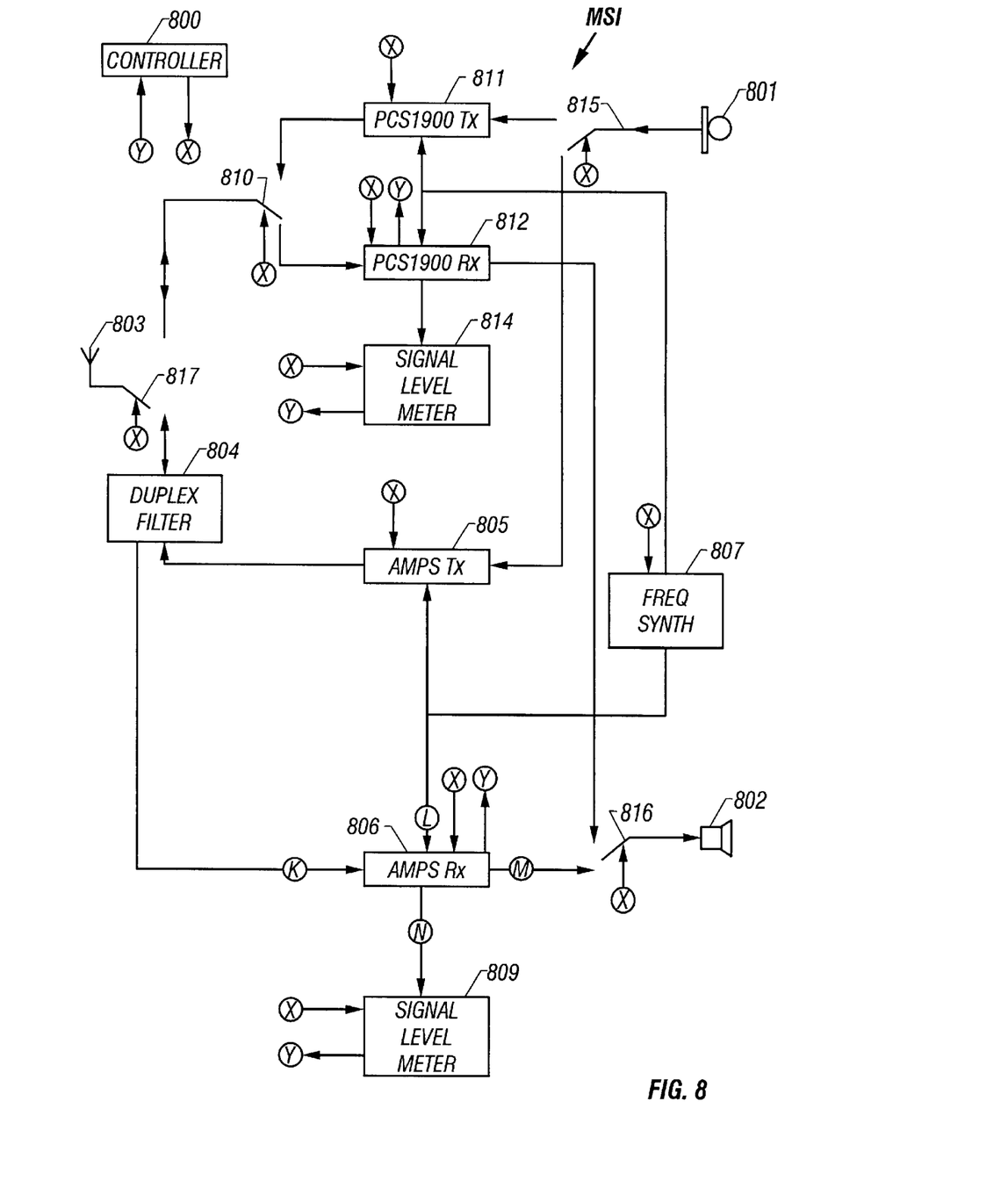
FIG. 8 is a block diagram of a mobile station in accordance with the present invention.
Figure 9:
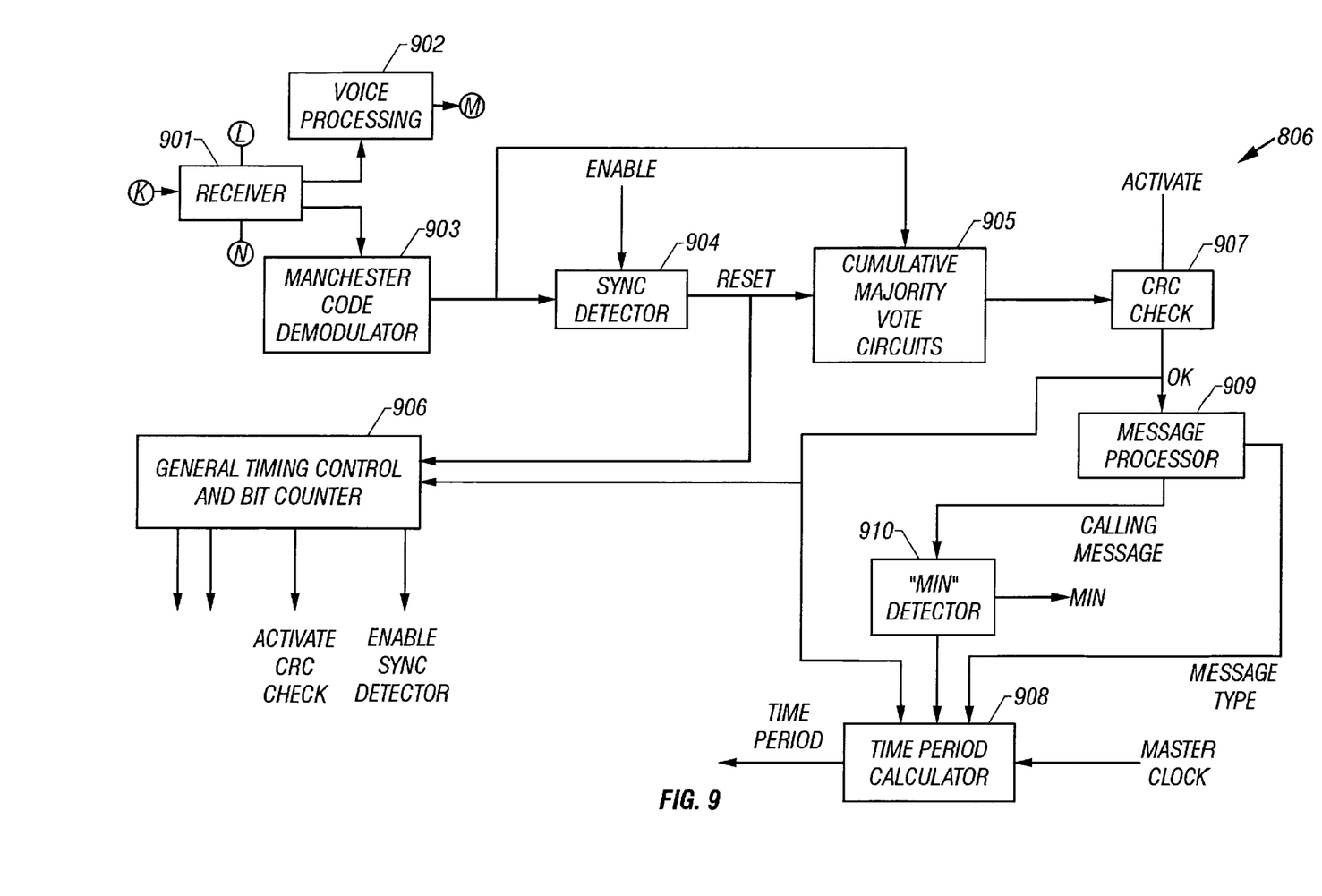
FIG. 9 is a block diagram of the AMPS Rx block of FIG. 8.

FIG. 8 and FIG. 9 shows block diagrams of the dualmode PCS1900/AMPS mobile station MS1 comprising one embodiment of the present invention.

The mobile station MS1 comprises:

message receiving means 806 for receiving messages on the monitored AMPS control channel;

message check means 907 for generating a check indication when the message data bits are consistent with the CRC check bits of a received word;

time period determining means 908 for determining, upon generation of the check indication, the previously introduced time period during which no new information intended for the mobile station will be transmitted;

scanning means 812, 814, 807 for scanning of radio channels;

controlling means 800 responsible for the overall control of the mobile station MS1 and deciding whether the determined time period should be used for scanning or entering a sleep mode, i.e. turning off portions of the mobile station MS1.

message processing means 909–910 for determining whether the data bits received identifies the mobile station MS1 as an intended receiver of the message.

More in detail, FIG. 8 shows how the mobile station MS1 comprises common blocks, AMPS specific blocks and PCS1900 specific blocks.

The common blocks comprises a controller 800, a microphone 801, an earphone 802, an antenna 803 and a frequency synthesizer 807.

The AMPS specific blocks comprises a duplex filter 804, an AMPS Tx block 805, an AMPS Rx block 806 and a first signal level meter 809.

The PCS1900 blocks comprises a time duplex switch 810, a PCS1900 Tx block 811, a PCS1900 Rx block 812 and a second signal level meter 814.

The mobile station MS1 further comprises connecting means (switches) 815–817 that, dependending on whether the mobile station MS1 is to transmit or receive signals in the AMPS network NET1 or PCS1900 network NET2 in FIG. 3 respectively, connects either AMPS or PCS 1900 specific blocks to the microphone 801, earphone 802, and antenna 803 respectively. The connecting means 815–817 are controlled by the controller 800.

The AMPS Tx block 805 and PCS1900 Tx block 811 are responsible for transforming the signal generated by the microphone 801 into radio signals to be transmitted to the AMPS network or the PCS1900 network respectively. The AMPS Tx block 805 and PCS1900 Tx block 811 are also responsible for transforming control information data supplied by the controller 800 into radio signals for transmission to the network NET1–NET2 in which the mobile station MS1 is currently operating.

The AMPS Rx block 806 and PCS1900 Rx block 812 are responsible for transforming radio signals, received from the AMPS network NET1 or PCS1900 network NET2 respectively, into a signal driving the earphone 802. The AMPS Rx block 806 and PCS1900 Rx block 812 are also responsible for transforming control channel radio signals received into data for further processing by the controller 800.

When the mobile station MS1 is scanning for a control channel in the AMPS or PCS1900 network, the AMPS Rx block 806 or PCS1900 Rx block 812 respectively are tuned to the selected radio channel frequency and the received signal energy is measured by the first 809 or second 814 signal level meter respectively. The measured signal strength is read and processed by the controller 800.

The frequency synthesizer 807 generates local oscillator signals used for the mixing of signals up to and down from radio frequency. Note that in PCS1900 time duplex is used, i.e. transmission and reception does not occur simultaneous, implying that only one local oscillator signal at a time needs to be generated. In AMPS however transmission and reception may occur similtaneous on different frequencies, and hence two local oscillator signals need to be generated. The synthesizer block 807 is capable of generating the nessecary local oscillator signals for operation in both the AMPS and PCS1900 networks.

The controller 800 executes stored program instructions and is responsible for the overall control of the mobile station MS1. The controller 800 processes data output by the Rx blocks 806, 812 and signal level meters 809, 814 and controls the other units in accordance with the program instructions. Connectors X and Y illustrates the interconnection between the controller 800 and the other units in FIG. 8.

Circuits that do not need to be active at a certain point in time are powered down to reduce power consumption. When the mobile station MS1 is operating in the PCS1900 network, all the AMPS specific circuits 805, 806, 809 are powered down at all times. As long as the mobile station MS1 is operating in standby mode the PCS1900 Tx block 811 is also powered down. When the mobile station MS1 is operating in the AMPS network, all the PCS1900 specific circuits 811, 812, 814 are powered down most of the time as well as the AMPS Tx block 805. However, when the mobile station MS1 decides to scan for PCS1900 control channels, part of the PCS1900 specific circuits 812, 814 are powered up to perform the scanning.

Since single mode AMPS and single mode PCS1900 mobile stations are well known to persons skilled in the art and the basic functions and structure of the dual mode PCS1900/AMPS mobile station MS1 corresponds to a merge of an AMPS and a PCS1900 mobile station into one, we will not elaborate further on the blocks in FIG. 8 except for the AMPS Rx block 806.

FIG. 9 provides more details on the internal structure of the AMPS Rx block 806. Connectors K, L, M, N in FIG. 8 and FIG. 9 illustrates how the AMPS Rx block 806, as shown in FIG. 9, is connected to the remaining blocks of FIG. 8.

In a receiver 901 the radio signals received are converted to a baseband signal. If the received radio signals carry speech information, a voice processing block 902 transforms the base band signal into the signal driving the earphone 802 in FIG. 8. When the mobile station is monitoring a control channel in the AMPS network, the received radio signals carry control information messages, and the baseband signal is input to a Manchester code demodulator 903.

The Manchester code demodulator 903 processes these signals to determine transmitted bit polarities and passes the processed bits to a sync detector 904. The Manchester code demodulator 903 and sync detector 904 can include a conventional frequency discriminator. Further details of a suitable Manchester code modem can be found in patent application WO 94/27377.

A cumulative majority vote circuit 905 provides cumulative majority vote decoding for each of the 40 bits in a received control message. Majority voting is normally defined for only odd numbers of repeats (3, 5, or more repeats) and it will be understood that the present invention can advantageously perform majority voting over even numbers of repeats also. Majority vote decoding over even numbers of repeats uses soft majority voting rather than hard majority voting in the preferred embodiment of the invention.

In hard majority voting, a data bit is represented by a number value of 1 or −1 corresponding to the Boolean values "0" and "1". Separate estimates of the repeated data bit may then be combined by numerical addition. For example, if a first estimate of a bit is +1, a second estimate is +1 and a third estimate is −1, their sum is 1+1−1=+1 to indicate that the majority vote result is +1. However, when combining an even number in a hard bit decision, an indeterminate value of 0 (e.g., 1+1−1−1=0) can occur.

Nevertheless, hard majority voting can in principle still be employed for decoding even numbers of repeats; one would just have to arbitrarily assign one or the other bit polarity in cases where the outcome is indeterminate. The resulting bit error rate would be less than without majority vote decoding, except in the case of a two-fold, hard majority vote which may be shown as follows.

In a situation where two estimates of each bit have the same probability of error in the mean but are otherwise uncorrelated, and this error probability is represented by "E", the probability that both estimates will be correct is thus (1−E)×(1×E). The majority vote makes a clear decision in this case. It also makes a clear wrong decision when both estimates are in error, which occurs with the probability of E×E. The probability that the two estimates disagree, given an indeterminate decision, is 2E(1−E). In half of these cases an arbitrary decision will be wrong and in the other half it will be right. Therefore, the total error probability is E×E+E(1−E)=E. Therefore, a two-fold hard-decision majority vote gives the same error probability as no majority vote in this circumstance.

However, the errors do not necessarily occur in the same place, nor is the number of errors in any particular message exactly the same with and without the majority vote. Therefore, there is still a non-zero chance that a two-fold majority vote of two message repeats will be error free or error correctable when the first and second repeats contain errors. The probability of an error-free or error-correctable majority vote increases as higher order (meaning more repeats) majority voting is employed.

In soft majority voting, however, a bit is not just represented by the values 1 or −1 (for Boolean 0 and 1) but by continuous measure reflecting the confidence of the bit's polarity. For example, 0.9 represents a "0" with a high confidence, while 0.1 represents a "0" with a low confidence whereas −1.25 represents a "1" with a very high confidence while −0.05 represents a "1" with a very low confidence. By adding in the confidence values of the corresponding bits, a net or cumulative confidence value representing the polarity of the bit is obtained, this value being valid for even numbers of repeats as well as odd numbers of repeats. The chance of exactly 0 resulting from adding soft bit values is small, so that an arbitrary treatment of 0 as always being positive number (or alternatively a negative number) has no significant impact on the resulting error rates. Soft majority voting is therefore the preferred technique for implementing the present invention, although hard majority voting can be employed with somewhat less favorable results.

The mobile station MS1 therefore includes a majority vote accumulator for each bit of a control word. The 40 accumulators are indicated by block 905 in FIG. 9. Upon detecting a dotting sequence D followed by a sync word S, these 40 accumulators are reset to 0. Detecting the dotting sequence followed by the sync word S may, for example, be achieved reliably in the following way.

The last 16 bits from the Manchester code demodulator 903 are clocked into a shift register. The contents of the shift register are interpreted as a binary number between 0 and 65535. This binary numerical value is compared with a first value corresponding to the last 5 bits of the dotting sequence, a busy/idle bit equal to 0 and the 11 bit sync word S, and with the second value corresponding to a busy/idle bit having a value of 1. If either comparison yields a match, the sync word S and dotting sequence D are deemed to have been detected. It is also possible to compare the last 6 bits of the dotting sequence D plus the first ten bits of the sync word S (including the unknown busy/idle bit) to obtain an advance sync indication, as well as allowing an imperfect match, for example by permitting any one bit to be in error in order to increase the probability of sync detection. Tradeoffs between detection probability and false alarm probability are appropriately balanced in designing the sync detector 904.

After sync detection has caused the value in the 40 cumulative majority vote circuits to be set to 0, the next 40-bit values out of the Manchester code demodulator 903 excluding the 4 busy/idle bits are added to the corresponding majority-vote accumulators 905, so that they now simply contain the first repeat A1 of the A control word. If the phone has an odd MIN, a timing/bit counting unit 906 will cause the first 40 data bits and the 4 busy/idle bits to be discarded and the second 40 bits B1 added to the accumulators 905 instead. At this point, a CRC check circuit 907 is activated by the timing/bit counting unit 906 to process the contents of the majority vote circuits 905 to decide if they contain a 40-bit, error-free word.

The processing by CRC check circuit 907 consists of temporarily hard-quantizing the soft bit values in the accumulators 950 to either −1 or +1 (Boolean 1 or 0) and then calculating a syndrome, which is the remainder upon polynomial division of the word by a CRC polynomial according to known art. A syndrome of all zeros signifies an error-free word, one of a predetermined forty non-zero syndrome values corresponding to one of the possible predetermined single-bit error patterns, and all other syndrome values correspond to more than a single-bit error.

By checking a non-zero syndrome with each of the 40 possible syndromes that would result in a single-bit error in one of the 28 data bits or 12 CRC bit positions, it can be determined if such a single-bit error has occurred and where it is located. It may then be corrected by inverting the bit in question. Alternatively, any other non-zero syndrome can be taken to mean that the data bits cannot be relied upon. Whether or not the device employs a single-bit error correction capability of the CRC code to correct an error is not critical to the implementation of the present invention. It is more important to simply identify that a word contains an uncorrected error.

Upon detection of an error free word, or a word in which a single bit error has been corrected by the above described procedure, an indication from the CRC check circuit 907 is provided to a time period calculator 908. The time period calculator 908 determines a time period corresponding to the remaining transmission time of the current word block. During this time period only redundant information is transmitted, i.e. no new information intended for the mobile station MS1 is transmitted during the time period. The time period may thus either be used by the mobile station MS1 to scan for the control channels in the PCS1900 network or to reduce power consumption by powering down circuitry in the mobile station MS1.

The CRC check circuit 907 also activates a message processor 909 to check if the type of message is a calling message, a broadcast message or a dummy (filler) message. If the message processor 909 determines that the message is a calling message, it activates a MIN detector 910 to check if the word contains at least part of the MIN of the mobile station MS1.

If the received MIN bits do not match corresponding bits of the MIN of the mobile station MS1, the MIN detector 910 generates a "not MIN" indication, which is provided to the time period calculator 908 along with the message type information from the message processor 909 (i.e., single or double word message) to enable it to compute a time period lasting until the next message is expected to begin, i.e. until the start of the next word block that may contain new information intended for the mobile station MS1. This may be two word blocks later as when the MIN of another mobile station is transmitted in a first word block and the message is a multiple word message. In this case it is known that at least the second word block will also be addressed to the other mobile station in order to complete the calling message. The first time a new message may be addressed to the mobile station MS1 in question is thus, in this case, two word blocks later. The time period thus determined may be used by the mobile station MS1 to either scan for the control channels in the PCS1900 network or to reduce power consumption by powering down circuitry in the mobile station MS1.

Two word blocks later, the word received may be a further continuation word of the previous message, as indicated by the continuation flag bits, in which case it can be ignored until receipt of the next word, whereupon a further check for continuation of the old message or commencement of a new message is made by the message processor 909.

If no CRC is indicated after processing the first word repeat and adding its 40-bit values into the majority vote circuits 905, the majority vote circuits 905 receive the 40-bit values of the next word repeat and add them to the corresponding values from the first repeat still in the accumulators. Thus, the majority vote circuits 905 at the end of the second repeat (A2 or B2) contain the sums of the corresponding bit values of the first and second word repeats. When the soft bit values are used as described above, the resulting 40 values represent the 40-bit word with a higher confidence of correctness than either repeat alone. If hard bit values are accumulated instead, the resulting values do not necessarily have a higher probability of giving a correct word, but at least have an independent chance of being correct. Thus, the cumulative probability of a word being detected error free after both the first and the second repeats is higher than the probability of detecting it on the first repeat alone. Consequently, upon processing the second word-repeat using accumulation of either hard or soft bit values, the CRC check circuit 907 is again activated. As before, if the CRC is error-free, a time period, corresponding to the remaining word block transmission time, may be used for either scanning or reducing power consumption irrespective of the MIN or message type.

However, taking account of the MIN and the message type can result in a longer time period and thus give an increased scanning capacity or additional power savings. Consequently, the MIN detector 910 is activated and if the MIN is found not to match that of the mobile station MS1, the time period calculator 908 calculates a longer time period.

If the CRC check does not indicate an error free message, the third message repeat becomes cumulatively added in the majority vote circuits 905 and so on until either the CRC checks at some stage, or all five message repeats have been exhausted. In the latter case, the sync detector 904 is re-enabled to search for dotting sequences D or sync words S for the next word block to be processed. Thus a message is CRC checked using cumulatively increasing amounts of bit-wise majority vote decoding until finally the full five-fold majority vote is employed if CRC did not check at an earlier stage.

It will be appreciated that the above signal processing operations may be carried out in the controller and/or specific hardware. In a preferred embodiment the Manchester code demodulator 903, sync detector 904, cumulative majority vote circuits 905, CRC check 907 and "MIN" detector 910 are implemented in specific hardware while the message processor 909 and time period calculator 908 are implemented as software executing in the controller 800.

Each time the time period calculator 908 determines a time period during which no new information intended for the mobile station MS1 will be transmitted, the controller 800 (see FIG. 8) determines how that time period will be used. If the controller 800 determines that the time period should be used to reduce power consumption, a power up timer is set and the frequency synthesizer 807 as well as the AMPS Rx block 806, except the timing unit 906, is powered down. When the power up timer expires at the end of the time period, the frequency synthesizer 807 and AMPS Rx block 806 is powered up again. The power up timer may be a separate timer or a timer built into the controller 800.

If the controller determines that the time period shall be used to scan for PCS1900 control channels, the controller 800 orders power down of the AMPS Rx block 806 as described above, but also power up of the PCS1900 specific circuitry 812, 814 that is necessary to perform the scanning. The controller then schedules scanning of the PCS1900 frequency band for the PCS1900 control channels. This is basically performed in the same way as when an ordinary single mode PCS1900 mobile station is scanning for control channels. However, the time period only offers the dualmode PCS1900/AMPS mobile station MS1 a limited time for scanning. The mobile station MS1 can thus only scan part of the the PCS1900 frequency band at each scanning instance. The scanning is then continued at the next available time period.

Figure 10A:
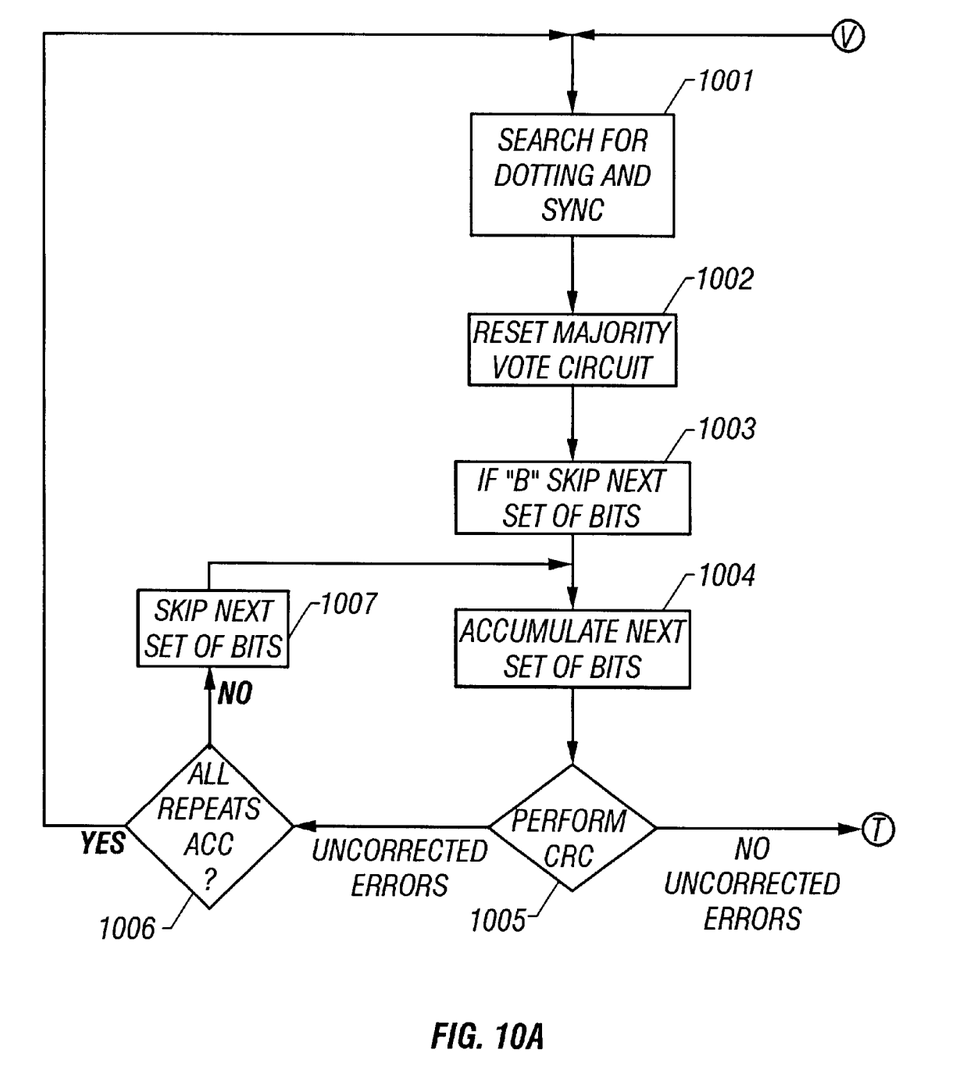
FIG. 10A to FIG. 10C is a flow chart providing details on the operation of a mobile station in accordance with the present invention.
Figure 10B:
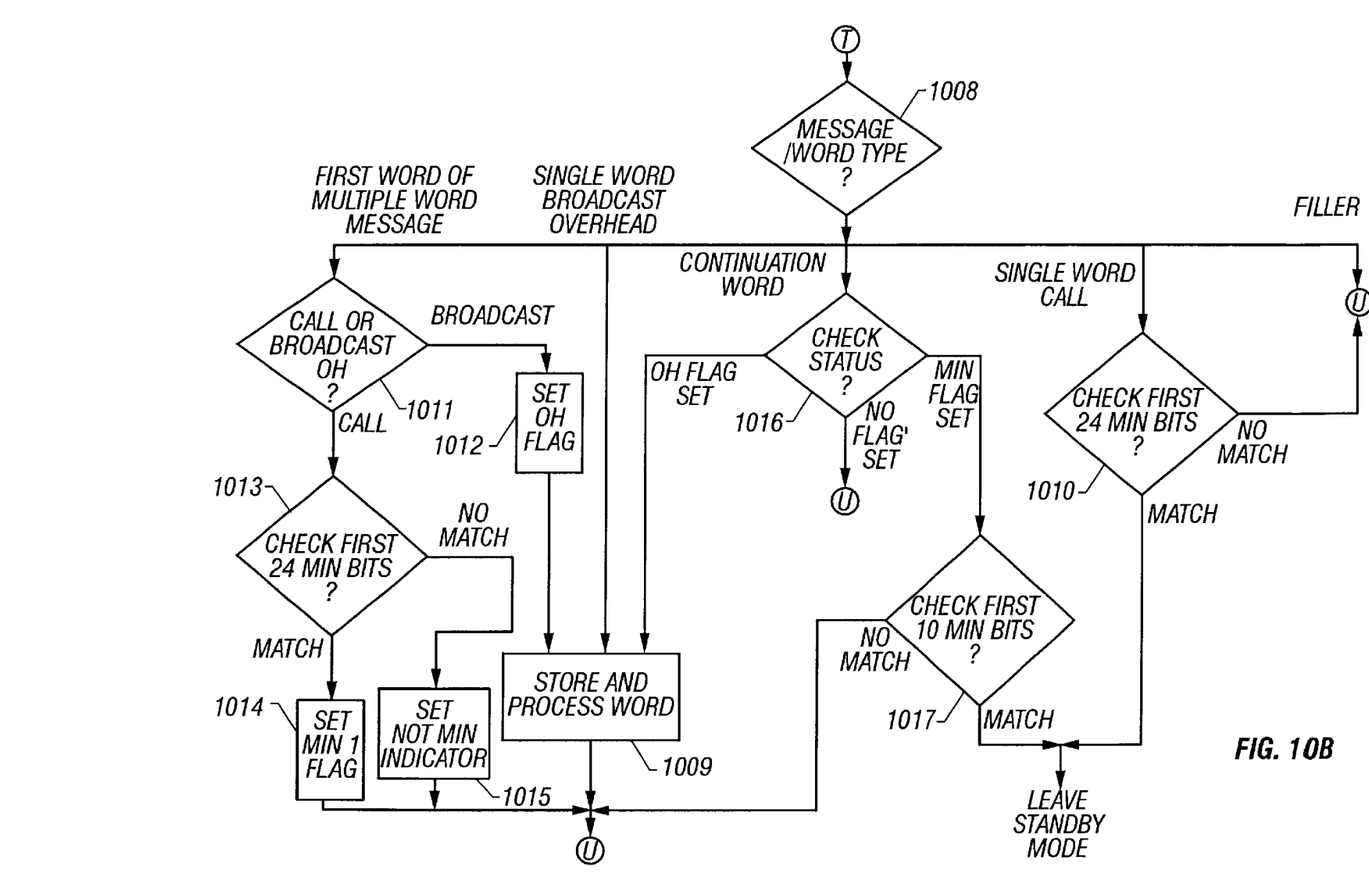
Figure 10C:
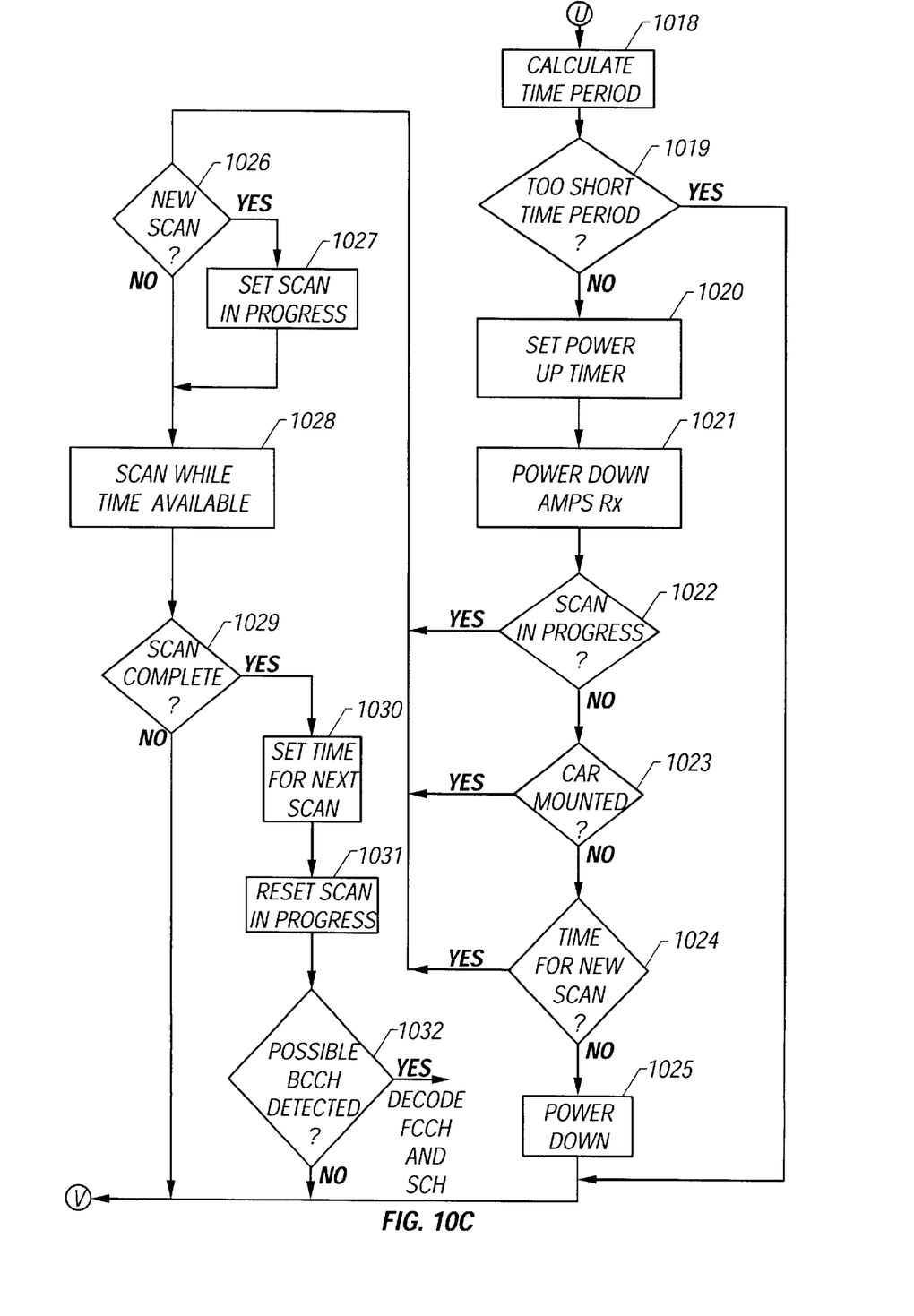

The flowcharts of FIG. 10A to FIG. 10C provides more details on the operation of the dualmode PCS1900/AMPS mobile station MS1. Connectors T, U, V shows how the flowcharts are interconnected.

At step 1001 of FIG. 10A the mobile station searches for dotting D and sync S words in the beginning of a word block. Upon detecting dotting D and sync words S, the cumulative majority vote process is initiated at step 1002 and continues at steps 1003–1007 until either CRC checks or all repeats have been received. At step 1002, the majority vote accumulators are reset. The process proceeds to step 1003 where it is determined whether a word of type "A" or type "B" is to be received and skipping the bits corresponding to the other channel. The next set of relevant bits are accumulated at step 1004, and a CRC check is performed at step 1005. If all repeats have not been accumulated, an alternative NO in step 1006, and there are uncorrected errors after the CRC check, the process skips the next set of bits (which belong to the other type of word) at step 1007 and proceeds to accumulate the next set of relevant bits at step 1004. Note that, as indicated previously, the busy/idle bits are not accumulated at step 1004 and that in steps 1003 and 1007 44 bits are discarded.In the case where all repeats have been accumulated as decided at an alternative YES in step 1006 and the accumulated repeats still contain uncorrected errors, the process is returned to step 1001 in order to receive the next word block.

In the case of a CRC check indicating an error free word prior to or after processing all five repeats, the nature of the received word/message is checked at step 1008 in FIG. 10B. The types of messages are:

1) A one-word call,
2) A multiple-word call,
3) A one-word filler,
4) A one-word broadcast/overhead message, or
5) A multiple-word broadcast.

Note that types 1) and 2) do not only include page messages, but all messages intended for a specific mobile station e.g. also directed retry.

Two bits of the word are used to distinguish between single-word messages, the first word of a multiple-word message and a continuation word of a multiple-word message. After testing the word type, the mobile station either ignores the rest of the world block till the next syncs are due, or ignores the rest of the word block and the whole of the next word block, or quits the standby mode because a one- or two-word call has been detected to contain the mobile station's MIN bits. Specifically, if the received word is a single word filler, the process continues at step 1018 in FIG. 10C. If the received word is a single word broadcast overhead message, the word is stored and processed at step 1009 after which the process continues at step 1018 in FIG. 10C.

If the received word is determined to be a single word call at step 1008, then the flags are cleared and the first 24 bits are checked for match with the mobile station's MIN at step 1010. If there is a match, then the mobile station leaves the stand-by mode and proceeds to handle the call. If the 24 bits do not match, then the process continues at step 1018 in FIG. 10C.

If the word is determined to be the first word of a multiple word message at step 1008, the flags are cleared and it is determined whether the multiple word message is a call or a broadcast overhead message at step 1011. If the message is a broadcast overhead message, then the O/H flag is set at step 1012, the word is stored and processed at step 1009 and the process continues at step 1018 in FIG. 10C. If the message is a call message, the first 24 MIN bits are checked at step 1013. If the first 24 bits match the mobile station's MIN, then a flag MIN1 is set at step 1014, and the process continues at step 1018 in FIG. 10C. If the 24 bits do not match the mobile station's MIN, then a no match indicator is set at step 1015 before the process is continued at step 1018 in FIG. 10C.

If the word is determined to be a continuation word at step 1008, then the process continues to step 1016 to check the status of flags. At step 1016, if an overhead flag O/H is set (in step 1012 described above), then the program proceeds to step 1009 where the continuation word broadcast overhead message is stored and processed. If a MIN1 flag is set (at step 1014 described above), then the last 10 MIN bits are checked at step 1017. If the last 10 MIN bits match the mobile stations MIN, the mobile station leaves the stand-by mode. If it does not match, then the process continues at step 1018 in FIG. 10C.

If upon checking the flag status at step 1016 it is determined no flag is set, then the process continues at step 1018 in FIG. 10C.

At step 1018 in FIG. 10C the time period lasting until the next message is expected to begin is calculated. If the "not MIN" indicator was set at step 1015, the next message is expected to begin two word blocks later. Otherwise the next message is expected to begin at the start of the next word block. The time period is calculated accordingly. As described in FIG. 6 each word block begins with the dotting sequence D and the sync word S that are used for synchronization. These two words must be read upon initial synchronization with the control channel, but once this initial synchronization has been achieved, the mobile station MS1 only needs to make some minor adjustments to maintain synchronization. These adjustments can be made without reading the dotting sequence D and the sync word at the beginning of each word block. Thus, by not receiving the dotting sequence D and sync word S the time period can be extended. The international patent application PCT/US96/08523 discloses a method and arrangement whereby synchronization can be maintained without reading the dotting sequence D and the sync word S at the beginning of each word block. In this method, the received data is sampled with 8 samples per bit. A search window corresponding to 2 bit periods i.e. 16 samples is defined. For each sample timing position cumulative majority vote decoding is carried out for a received word. CRC checks are carried out for each sample timing position and a synchronization histogram is updated for those sample timing positions which the CRC check indicates consistency between the data bits and the check bits. Synchronization is adjusted so that the sampling position associated with the maximum histogram location is always at the center of the search window. In order to simplify the flowchart in FIG. 10A, the above described modification of the synchronization scheme has not been illustrated in the flowchart.

At step 1019 a check is made whether the time period determined at step 1018 is to short to be used for scanning or reduction of power consumption. If so (alternative YES), the process continues at step 1001 in FIG. 10A. Otherwise (alternative NO) the power up timer is set at step 1020 to power up the AMPS Rx block 806 at the end of the time period and the AMPS Rx block 806, except the timing unit 906, is powered down at step 1021. At step 1022 a check is made if scanning is in progress. If no scan is in progress (alternative NO) a check is made in step 1023 to determine if the mobile station is mounted in a vehicle (e.g. a car). If the mobile station is not mounted in a vehicle (alternative NO), a check is made in step 1024 to determine if it is time to initiate a new scan. If it is not time to initiate a new scan (alternative NO), the time period is used to reduce power consumption and additional circuitry in the mobile station, e.g. the frequency synthesizer 807, is powered down at step 1025 until the power up timer expires and the process continues at step 1001 in FIG. 10A. Steps 1023 and 1024 controls the trade off between scanning capacity and reduction of power consumption. A vehicle mounted mobile station MS1 has a greater likelihood of being relatively fast moving and thus it makes sense to scan as often as possible, in particular since a vehicle mounted mobile station typically is connected to an external power supply and thus there is no need to reduce power consumption in order to increase operation time. A mobile station not mounted in a vehicle has typically no external power supply and thus it is important to try and reduce power consumption in order to increase operation time for the mobile station. A common way to determine whether a mobile station is to be considered as vehicle mounted is in fact to sense whether the mobile station is connected to an external power supply.

For each of the steps 1022–1024, if the check results in alternative YES, the process continues at step 1026. At step 1026 a check is made whether a new scan is to be initiated. If so (alternative YES), a scan in progress indicator is set at step 1027 before a new scan is initiated at step 1028. If the check at step 1026 results in alternative NO, i.e. the scan in progress indicator was set, the scan in progress is continued at step 1028. As indicated earlier on, scanning for PCS1900 control channels is basically performed in the same way as in ordinary single mode PCS1900 mobile stations and will not be elaborated in detail. Details on this procedure can be found in the PCS1900 air interface specification J-STD-007 volume 1. Basically, as described above, when scanning for PCS1900 control channels the PCS1900 Rx block 812 is tuned to each radio channel frequency in a list of such frequencies and the received signal strength is measured by the second signal level meter 814. The list of frequencies either corresponds to all the downlink radio channels in the PCS1900 frequency band or a subset of those frequencies stored in a BCCH list. A difference as compared with a single mode PCS1900 mobile station is that the time period only offers the dualmode PCS1900/AMPS mobile station a limited time for scanning. Thus typically more than one time period will be needed to scan all of the channels in said list of radio frequency channels. A pointer variable is used to keep track on what radio channel frequency is next in turn. When a new scan is initiated, the pointer always points to the first radio channel in said list, while when a scan in progress is continued the pointer points to a radio channel somewhere further down the list.

After step 1028 a check is made at step 1029 to determine if all relevant radio channels have been received once for this scan. If this is not the case (alternative NO), a pointer to the next radio channel in turn is stored before the process continues at step 1001 in FIG. 10A. If the check in step 1029 results in alternative YES, the time after which the next scan should be initiated is set at step 1030 and the scan in progress indicator is reset at step 1031. At step 1032 a check is made whether for any of the scanned radio channels the received signal energy is enough that a BCCH carrier is presumed to have been detected. If not (alternative NO) the process continues at step 1001 in FIG. 10A otherwise (alternative YES) the mobile station tries to detect and decode the logical channels FCCH and SCH carried by the strongest presumed BCCH carrier.

The scheduling in time of the FCCH and SCH detection and decoding can be done in many different ways. The basic problem to be aware of is that, as is well known to the person skilled in the art, the FCCH and SCCH channels (bursts) are transmitted only in time slot zero of certain TDMA frames on a BCCH carrier. The contiguous time interval needed to perform FCCH detection in a way that ensures the dualmode PCS1900/AMPS mobile station MS1 will not miss the transmission of the FCCH channel corresponds to the transmission time for a little more than 11 contiguous TDMA frames i.e ≈51 ms. If less time is spent when trying to detect the FCCH channel, there is a risk that the mobile station will miss the transmission of the FCCH channel. Thus when scheduling the FCCH/SCH detection this problem must be considered.

One simple way to schedule the FCCH/SCH detection/decoding is to abandon monitoring of the AMPS control channel and use all available time to perform these tasks.

It is however possible to perform both FCCH and SCH detection/decoding without abandon monitoring.

Thus another way of scheduling the FCCH detection while still monitoring the AMPS control channel is by, as described previously, determining a time period when no new information intended for the mobile station MS1 is transmitted and, on condition that the time period is long enough to ensure detection of the FCCH, using that time period to perform the FCCH detection/decoding. Note that the time period must be longer than 51 ms, e.g. around 63 ms, to allow the frequency synthesizer to stabilize when tuning to the BCCH carrier and retuning to the AMPS control channel respectively.

A third way of scheduling the FCCH-detection would be to use a number of time periods, during which no new information intended for the mobile station MS1 will be transmitted on the AMPS control channel, to perform FCCH-detection. It is possible to determine a maximum number of contiguous word blocks that must be used for the FCCH-detection as described below.

When considering the so called 51-multiframe structure used in PCS1900 on the BCCH carrier, it is possible to define a maximum time window that needs to be searched in order to ensure that a frequency correction burst, carrying the FCCH, will be transmitted in that window. We denote this time window $T_{FCCH}$. $T_{FCCH}$ corresponds to 11 TDMA-frames plus an extra time slot i.e. $T_{FCCH}$=51.34 ms (1). For each word block, depending on how many word repeats is needed to correctly receive a word, a search window $T_{SEARCH}$ available for performing the FCCH-detection can be defined. Assuming that two out of five word repeats are needed to correctly receive the word and allowing some overhead time for the stabilization of the frequency synthesizer, we can set $T_{SEARCH}$=21 ms (2).

The time corresponding to one 51-multiframe corresponds to little more than 5 AMPS word blocks. This means that the AMPS world block structure and the PCS1900 51-multiframe structures slides relative to each other. More precisely at the beginning of each new 51-multiframe, the AMPS word block structure will have been shifted an amount corresponding to $T_{SHIFT}$=3.865 ms (3).

The number of 51-multiframes that must pass before the search window $T_{SEARCH}$ has been shifted so that the whole time window $T_{FCCH}$ has been covered can be determined as $(T_{FCCH}-T_{SEARCH})/T_{SHIFT}$=(51.34−21)/3.865=7.85 (4).

From (4) it is apparent that after 8 51-multiframes the whole time window $T_{FCCH}$ has been covered by the search window $T_{SEARCH}$. Eight 51-multiframes corresponds to a little less than 41 word blocks ≈1.9 s. Thus within 1.9 s the mobile station MS1 will have had an opportunity to detect the frequency correction burst.

It is of course also possible to combine the second and third way of scheduling the FCCH detection/decoding. The 51-multiframe structure allows the mobile station MS1, once it has found a frequency correction burst, to calculate when in time synchronization bursts carrying the SCH will occur. As soon as one of these calculated occurences coincides with a time period when the mobile station MS1 does not need to monitor the AMPS control channel, the mobile station MS1 will perform SCH-detection.

Apart from the scheduling in time of FCCH/SCH detection and decoding these tasks are basically performed in the same way as in an ordinary single mode PCS1900 mobile station and is not elaborated further.

If the FCCH and SCH decoding are successful and a BCCH carrier of the PCS1900 network NET2 in FIG. 3 has been found, the dualmode PCS1900/AMPS mobile station MS1 will register with the PCS1900 network NET2 and begin operating in that network NET2. How incoming calls should be routed to the mobile station MS1 is not important to the present invention. One way would be to make use of a "Call forward on no answer" service to forward calls from the PCS1900 network NET2 to the AMPS network NET1 when no answer is received upon paging the mobile station MS1 in the PCS1900 network NET2. Another way would be to a method in which the PCS1900 network NET2 informs the AMPS network NET1 when the mobile station MS1 has registered in the PCS1900 network NET2 and vice versa.

The invention can be applied in other types of mobile stations than a dual mode PCS1900/AMPS mobile station as described above. The invention can of course be applied in other kinds of dual mode or multi mode mobile stations such as a TACS/GSM/DCS1800 multi mode mobile station. The invention can also be applied in a single mode mobile station as demonstrated in the two examples below.

Assuming the mobile station MS1 in FIG. 2 is a single mode AMPS mobile station according to the invention, while monitoring the control channel CC1 of the serving cell C1, the mobile station MS1 would be able to scan for other control channels CC2–CC3 in the network NET1 having superior signal quality. Once a control channel CC2 having superior characteristics has been found, the mobile station MS1 can start monitor that control channel CC2. Thus the word error rate of signals received by the mobile station may decrease, thereby increasing the probability of correctly receiving messages with control information.

Assuming that MS1 in FIG. 3 is a single mode mobile station MS1 according to the invention and that NET2 is a preferred AMPS network, while monitoring the control channel CC1 of the serving cell in the first network NET1, the mobile station MS1 would be able to scan for control channels CC4–CC6 in the preferred AMPS network NET2. Once a control channel CC6 transmitted by a base station BS6 in the preferred network NET2 has been found, the mobile station can register in the preferred network NET2 and start monitoring said control channel CC6 in the preferred network NET2.

As is apparent to the person skilled in the art, the invention enables a mobile station, when operating in standby mode and monitoring a control channel in a first network, to perform scanning for the combined purposes of finding control channels in the first network having superior characteristics or finding control channels of a preferred network, the preferred network being of the same or a different type as compared to the first network.

What is claimed is:

1. A method for controlling scanning of radio channels in a radio communication system, the controlling being performed by a mobile station in standby mode monitoring a control channel on which a first base station in a first radio communication network in the system transmits messages with control information, said method comprising the steps of:
   (a) receiving one of said messages in the mobile station, said received message comprising at least one block of information bits, the block including a plurality of data bits and a plurality of check bits whose value depends on said data bits;
   (b) generating a first indication when said data bits are considered as correctly received;
   (c) determining upon generation of said first indication, a time period according to a predetermined rule during which the blocks of information bits conveying said message contain no new information intended for the mobile station; and
   (d) scanning of said radio channels during at least part of said time period.

2. The method according to claim 1, wherein the first indication generated in step (b) is a check indication generated when said data bits are consistent with said check bits.

3. The method according to claim 2, wherein said check indication generation in step (b) includes correcting bit errors in said data bits.

4. The method according to claim 1, wherein said message comprises at least two blocks of information bits and said predetermined rule comprises the steps of:
   (i) detecting whether the data bits received for the message identifies the mobile station as an intended receiver of the message; and
   (j) determining, if the message is not intended for the mobile station, said time period as lasting until receipt of a next message is expected.

5. The method according to claim 1, wherein said blocks of information bits are repeated and said predetermined rule comprises the step of determining said time period as lasting until receipt of a next block of non redundant information bits is expected.

6. The method according to claim 5, further comprising the step of accumulating values of said information bits of said repeated blocks.

7. The method according to claim 6, wherein said accumulation step accumulates values of said information bits by soft majority voting.

8. A method according to claim 6, wherein said accumulation step accumulates values of said information bits by hard majority voting.

9. The method according to claim 1, wherein said radio channels are used for the transmission of control channels by other base stations in said first radio communication network.

10. The method according to claim 1, wherein said radio channels are used for the transmission of control channels by base stations in a second radio communication network.

11. The method according to claim 10, wherein said second radio communication network is a different type than said first radio communication network.

12. The method according to claim 11, wherein said first radio communication network is an AMPS type and said second radio communication network is a PCS 1900 type.

13. The method according to claim 11, wherein said first radio communication network is a TACS type and said second radio communication network is a GSM type.

14. The method according to claim 11, wherein said first radio communication network is a TACS type and said second radio communication network is a DCS 1800 type.

15. A method for controlling scanning of radio channels in a radio communication system, the controlling being performed by a mobile station in standby mode monitoring a control channel on which a first base station in a first radio communication network in the system transmits messages with control information, said method comprising the steps of:

(a) receiving one of said messages in the mobile station, said message comprising at least one block of information bits, the block including a plurality of data bits and a plurality of check bits whose value depends on said data bits;

(b) generating a first indication when said data bits are considered as correctly received;

(c) determining upon generation of said first indication, a time period according to a predetermined rule during which the blocks of information bits conveying said message contain no new information intended for the mobile station;

(d) determining whether the mobile station is mounted to a vehicle;

(e) determining an amount of time elapsed since a previous channel scanning operation;

(f) turning off portions of the mobile station during at least part of said time period if said elapsed amount of time is less than a predetermined amount of time and the mobile station is not vehicle mounted; and (g) scanning of said radio channels during at least part of said time period if said mobile station is vehicle mounted or said elapsed amount of time is greater than said predetermined amount of time.

16. The method according to claim 15, wherein the first indication generated in step (b) is a check indication generated when said data bits are consistent with said check bits.

17. The method according to claim 16, wherein said check indication generation in step (b) includes correcting bit errors in said data bits.

18. The method according to claim 15, wherein said message comprises at least two blocks of information bits and said predetermined rule comprises the steps of:

(i) detecting whether the data bits received for the message identifies the mobile station as an intended receiver of the message; and (j) determining, if the message is not intended for the mobile station, said time period as lasting until receipt of a next message is expected.

19. The method according to claim 15, wherein said blocks of information bits are repeated and said predetermined rule comprises the step of determining said time period as lasting until receipt of a next block of non redundant information bits is expected.

20. The method according to claim 19, further comprising the step of accumulating values of said information bits of said repeated blocks.

21. The method according to claim 20, wherein said accumulation step accumulates values of said information bits by soft majority voting.

22. A method according to claim 20, wherein said accumulation step accumulates values of said information bits by hard majority voting.

23. The method according to claim 15, wherein said radio channels are used for the transmission of control channels by other base stations in said first radio communication network.

24. The method according to claim 15, wherein said radio channels are used for the transmission of control channels by base stations in a second radio communication network.

25. The method according to claim 24, wherein said second radio communication network is a different type than said first radio communication network.

26. The method according to claim 25, wherein said first radio communication network is an AMPS type and said second radio communication network is a PCS 1900 type.

27. The method according to claim 25, wherein said first radio communication network is a TACS type and said second radio communication network is a GSM type.

28. The method according to claim 25, wherein said first radio communication network is a TACS type and said second radio communication network is a DCS 1800 type.

29. A mobile station for operation in a radio communication system having at least a first radio communication network, said network having at least a first base station which transmits messages with control information on a control channel, the mobile station comprising:

a receiver for receiving one of said messages in the mobile station, said message comprising at least one block of information bits, the block including a number of data bits and a number of check bits whose value depends on said data bits;

a CRC check circuit for generating a first indication when said data bits are considered as correctly received;

a time period calculator for determining, upon generation of said first indication, a time period according to a predetermined rule during which the blocks of information bits conveying said message contain no new information intended for the mobile station; and a scanning means for scanning of radio channels during at least part of said time period.

30. The mobile station according to claim 29, wherein said first indication generated by said CRC check circuit is a check indication generated when said data bits are consistent with said check bits.

31. The mobile station according to claim 30, wherein said CRC check circuit further corrects bit errors in said data bits.

32. The mobile station according to claim 29, wherein the mobile station further comprises a message processing means for determining, upon generation of said first indication, whether the data bits received for the message identifies the mobile station as an intended receiver of the message and said time period calculator determining, if the message is not intended for the mobile station, said time period as lasting until receipt of a next message is expected.

33. The mobile station according to claim 29, wherein said blocks of information bits are repeated and said time period calculator determines said time period as lasting until receipt of a next block of non redundant information bits is expected.

34. The mobile station according to claim 33, wherein the mobile station further comprises a cumulative majority vote circuit for accumulating values of said information bits of said repeated blocks.

35. The mobile station according to claim 34, wherein said cumulative majority vote circuit accumulates values of said information bits by soft majority voting.

36. The mobile station according to claim 34, wherein said cumulative majority vote circuit accumulates values of said information bits by hard majority voting.

37. The mobile station according to claim 29, wherein said radio channels are used for the transmission of control channels by other base stations in said radio communication network.

38. The mobile station according to claim 29, wherein said radio channels are used for the transmission of control channels by base stations in a second radio communication network.

39. The mobile station according to claim 38, wherein said second radio communication network is a different type than said first radio communication network.

40. The mobile station according to claim 38, wherein said first radio communication network is an AMPS type and said second radio communication network is a PCS 1900 type.

41. The mobile station according to claim 39, wherein said first radio communication network is a TACS type and said second radio communication network is a GSM type.

42. The mobile station according to claim 39, wherein said first radio communication network is a TACS type and said second radio communication network is a DCS 1800 type.

43. A mobile station for operation in a radio communication system comprising at least a first radio communication network, said network comprising at least a first base station which transmits messages with control information on a control channel, the mobile station comprising:

a receiver for receiving one of said messages in the mobile station, said message comprising at least one block of information bits; the block including a number of data bits and a number of check bits whose value depends on said data bits;

a CRC check circuit for generating a first indication when said data bits are considered as correctly received;

a time period calculator for determining, upon generation of said first indication, a time period according to a predetermined rule during which the blocks of information bits conveying said message contain no new information intended for the mobile station;

a scanning means for scanning of radio channels;

a controller for determining whether the mobile station is mounted to a vehicle, the controller further for determining an amount of time elapsed since a previous channel scanning operation, the controller still further for entering a sleep mode for said time period if said elapsed amount of time is less than a predetermined amount of time and the mobile station is not vehicle mounted and initiating scanning if the mobile station is vehicle mounted or said elapsed amount of time is greater than said predetermined amount of time, and wherein said scanning means scanning for said radio channels during at least part of said time period.

44. The mobile station according to claim 43, wherein said first indication generated by said CRC check circuit is a check indication generated when said data bits are consistent with said check bits.

45. The mobile station according to claim 44, wherein said CRC check circuit further corrects bit errors in said data bits.

46. The mobile station according to claim 43, wherein the mobile station further comprises a message processing means for determining, upon generation of said first indication, whether the data bits received for the message identifies the mobile station as an intended receiver of the message and said time period calculator determining, if the message is not intended for the mobile station, said time period as lasting until receipt of a next message is expected.

47. The mobile station according to claim 43, wherein said blocks of information bits are repeated and said time period calculator determines said time period as lasting until receipt of a next block of non redundant information bits is expected.

48. The mobile station according to claim 47, wherein the mobile station further comprises a cumulative majority vote circuit for accumulating values of said information bits of said repeated blocks.

49. The mobile station according to claim 48, wherein said cumulative majority vote circuit accumulates values of said information bits by soft majority voting.

50. The mobile station according to claim 48, wherein said cumulative majority vote circuit accumulates values of said information bits by hard majority voting.

51. The mobile station according to claim 43, wherein said radio channels are used for the transmission of control channels by other base stations in said radio communication network.

52. The mobile station according to claim 43, wherein said radio channels are used for the transmission of control channels by base stations in a second radio communication network.

53. The mobile station according to claim 52, wherein said second radio communication network is a different type than said first radio communication network.

54. The mobile station according to claim 53, wherein said first radio communication network is an AMPS type and said second radio communication network is a PCS 1900 type.

55. The mobile station according to claim 53, wherein said first radio communication network is a TACS type and said second radio communication network is a GSM type.

56. The mobile station according to claim 53, wherein said first radio communication network is a TACS type and said second radio communication network is a DCS 1800 type.

* * * * *